United States Patent [19]

Burg

[11] Patent Number: 4,923,322

[45] Date of Patent: May 8, 1990

[54] CLAMPED FRAMEWORK ASSEMBLY AND CONNECTORS USED THEREWITH

[75] Inventor: Robert J. Burg, Hartsdale, N.Y.

[73] Assignee: Uni Corp., Bronx, N.Y.

[21] Appl. No.: 320,522

[22] Filed: Mar. 8, 1989

[51] Int. Cl.$^5$ .............................................. B25G 3/00
[52] U.S. Cl. .................................. 403/190; 403/255; 211/191
[58] Field of Search ............... 403/190, 199, 235, 237, 403/234, 236, 191, 252, 255, 254; 211/191, 192, 193

[56] References Cited

U.S. PATENT DOCUMENTS

| | | | |
|---|---|---|---|
| 2,941,855 | 6/1960 | Weill | 403/237 |
| 3,185,268 | 5/1965 | Heine | 403/260 |
| 3,901,613 | 8/1975 | Anderson | 403/406 |
| 4,007,993 | 2/1977 | Schwartz | 403/191 X |

FOREIGN PATENT DOCUMENTS 666326  8/1964  Italy .................... 403/190

Primary Examiner—Andrew V. Kundrat
Attorney, Agent, or Firm—Fitzpatrick, Cella, Harper & Scinto

[57] ABSTRACT

A structural framework assembly made up of tubular members interconnected by a first connector arrangement which uses a connector having a concave surface pressing against a curved outer surface of a tubular member and having a pair of spreadable arms which are spread by a setscrew to lock inside an end of another tubular member, and a second connector arrangement which uses a connector plate extending into the end of a tubular member with the bottom of the connector plate inserted into a longitudinal slot at the bottom of the tubular member and a top tab on the connector plate inserted into an upper slot at the top of the tubular member. The longitudinal slot at the bottom of the tubular member opens out to the end of the tubular member and the upper slot is located at a distance from the end of the tubular member.

14 Claims, 3 Drawing Sheets

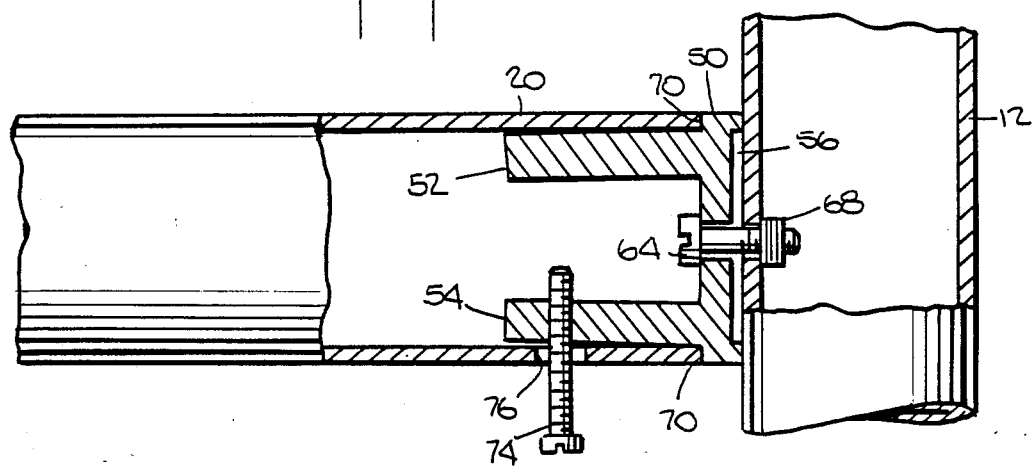
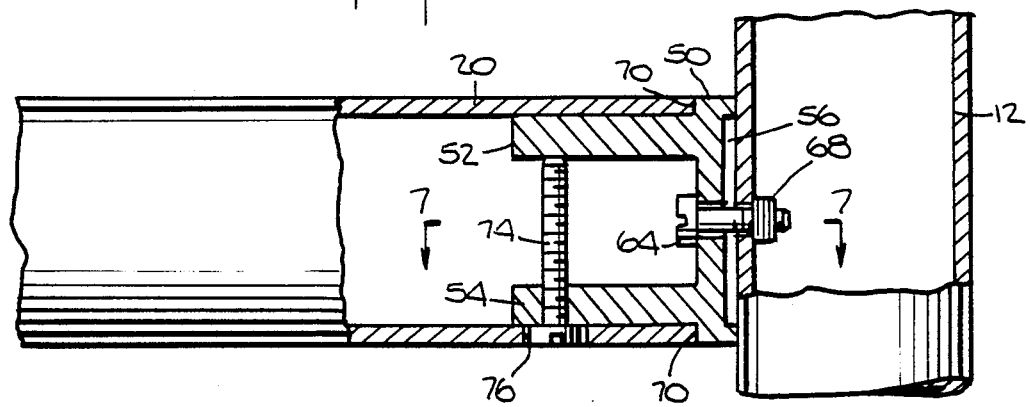
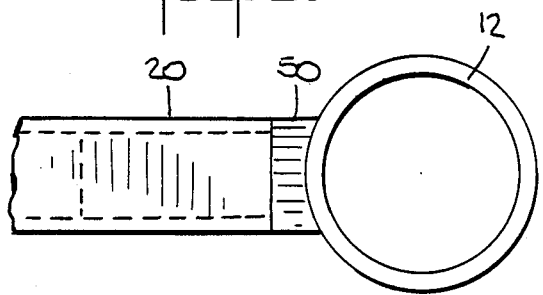
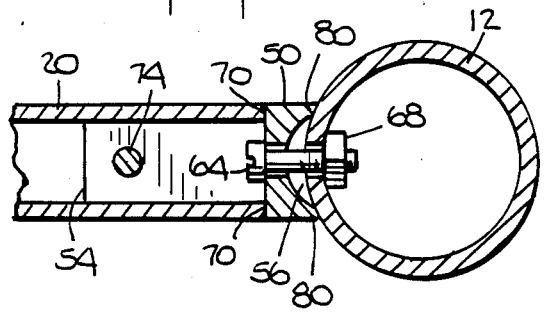

CLAMPED FRAMEWORK ASSEMBLY AND CONNECTORS USED THEREWITH

BACKGROUND OF THE INVENTION

1. Field of the Invention

This invention relates to clamped tube framework assemblies and connectors used in such assemblies. Description of the Prior Art Shelving and other framework structures are often assembled from tubular elements which are held together by welding or clamping. Clamping is a preferred technique for fabricating many framework structures because it allows the tubular elements of steel or aluminum to be prefinished and shipped in a compact package and erected at the site where the structure is to be used. Conventional clamps, however, are often complex and difficult to assemble. Also, clamps do not readily accommodate the assembly of tubular elements of different cross sections, e.g. circular and rectangular.

A further problem is encountered in clamped framework assemblies, such as shelving, wherein it is often desired to remove or adjust the position of a shelf without special tools and without taking the entire assembly apart. At the same time, the shelf support must be rigid and held in fixed orientation at each position to which it is set.

SUMMARY OF THE INVENTION

According to one aspect of the invention, there is provided a novel connector for connecting together a curved outer surface of a first elongated tubular member and an end of a second elongated tubular member. This novel connector comprises a block having a side surface formed with a concavity which extends along a line and opens at its opposite ends to upper and lower surfaces of the block. The block is also formed with a hole which extends therethrough to accommodate a bolt. The hole opens out near the center of the concavity. The block also contains a formation on a portion thereof away from the concavity for attaching the block to one end of a second elongated tubular member.

In another aspect, the invention relates to a connector assembly comprising a block as above described wherein the block is connected with a bolt to the side surface of a first elongated tubular member and wherein the block is further connected to a second elongated tubular member.

According to a further aspect of the invention, there is provided a novel connector for connecting a first elongated tubular member to an open end of a second elongated tubular member. This novel connector comprises a bracket having two arms extending in spaced apart, substantially parallel relationship from a common base. One of the arms has, near one end, a threaded setscrew hole extending therethrough toward the other arm so that a setscrew threaded into the hole in the one arm can be made to press against the other arm and force the two arms apart to clamp against opposite inner surfaces at the open end of a second elongated tubular member. Means are also provided on the common base for connecting same to a first elongated tubular member.

In another aspect the invention relates to a connector assembly comprising a bracket as above described with its arms projecting into the open end of a second elongated tubular member and a setscrew threaded through the hole in one arm and pressing against the other arm to force the arms apart to clamp against opposite inner surfaces of the second elongated tubular member. The common base is also connected to a first elongated tubular member.

In a still further aspect, the invention comprises a novel connector assembly for releasably connecting to a first elongated tubular member, an open end of a second elongated tubular member. This novel connector assembly comprises the second elongated tubular member and a generally rectangular connector plate. The connector plate is attachable along one vertical edge to the first elongated tubular member to project outwardly therefrom and to extend into the open end of the second elongated tubular member. The second elongated tubular member is formed with an elongated slot extending along the bottom thereof and opening out to the one end thereof. The upper edge of the connector plate supports the second elongated tubular member along the under surface of the upper portion thereof; and the connector plate also extends down and into the elongated slot.

In a specially improved form of this last described aspect of the invention, the connector plate is provided with a top tab extending upwardly from a portion of its upper surface and into a corresponding slot in the top of the second elongated tubular member.

BRIEF DESCRIPTION OF THE DRAWINGS

FIG. 4 is a fragmentary elevational view, partially in section, showing the connector element of FIGS. 2 and 3 in partial assembly with the circular and rectangular cross section tubular elements;

FIG. 5 is a view similar to FIG. 4, showing the connector element in full assembly with the tubular and rectangular cross section elements;

FIG. 6 is a fragmentary top view of the assembly of FIG. 5;

FIG. 7 is a section view taken along line 7—7 of FIG. 5;

DETAILED DESCRIPTION OF THE PREFERRED EMBODIMENTS

Figure 1:
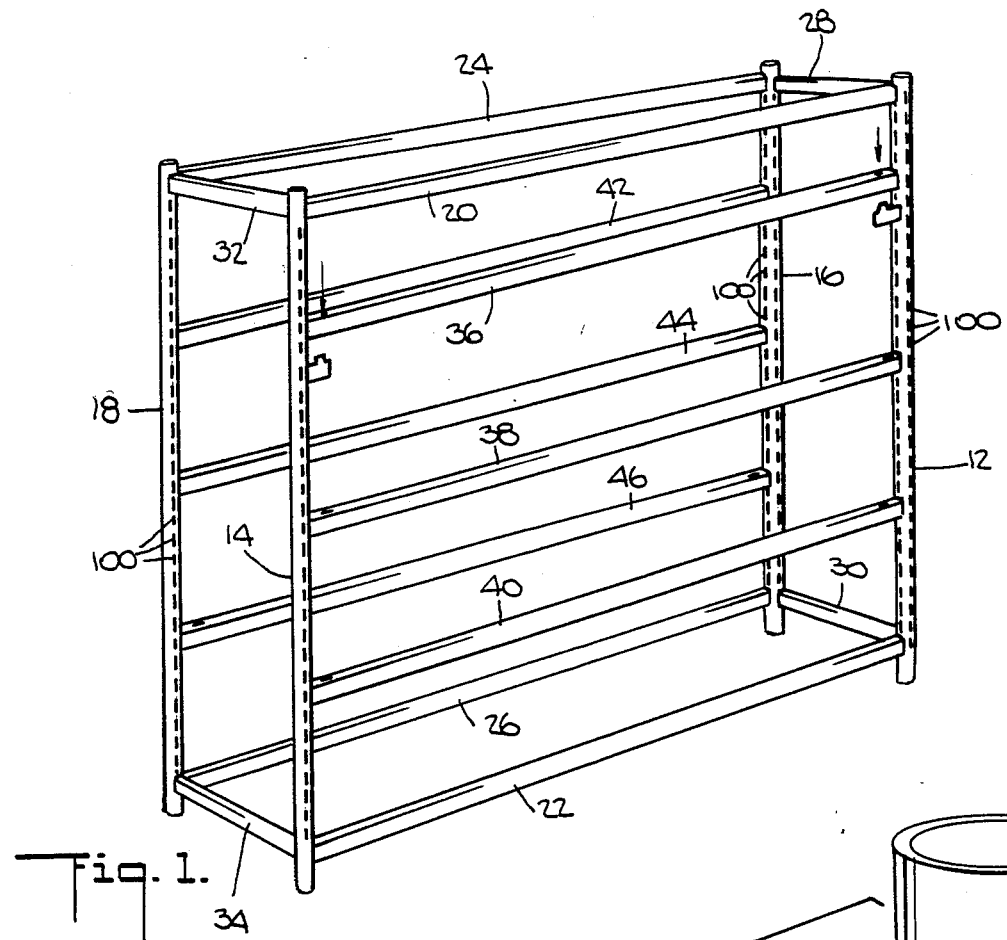
FIG. 1 is a perspective view of a framework assembly, in the form of an adjustable shelf structure, constituting one embodiment of the present invention.

The shelf structure of FIG. 1 comprises two vertically extending front tubular members 12 and 14 of circular cross section and two vertically extending rear tubular members 16 and 18 also of circular cross section. A horizontally extending upper front horizontal member 20 of rectangular cross section extends between and is connected to the front tubular members 12 and 14 near their upper ends and a horizontally extending lower front horizontal member 22 also of rectangular cross section extends between and is connected to the front tubular members 12 and 14 near their lower ends. Horizontally extending upper and lower rear horizontal members 24 and 26 of rectangular cross section extend between and are connected to the rear tubular members 16 and 18. Horizontally extending upper and lower end members 28 and 30 of rectangular cross section extend between and are connected to the vertically extending front and rear tubular members 12 and 16 near their upper and lower ends respectively. Similar horizontal upper and lower end members 32 and 34 extend between and are connected to the vertically extending front and rear tubular members 14 and 18 near their upper and lower ends respectively.

A group of spaced apart horizontal front shelf support tubular members 36, 38 and 40 of rectangular cross section extend between and are connected at their ends to the front tubular members 12 and 14 at spaced apart locations therealong between the upper and lower front horizontal members 20 and 22. A similar group of spaced apart horizontal rear shelf support tubular members 42, 44 and 46 extend between and are connected at their ends to the rear tubular members 16 and 18 at corresponding spaced apart locations therealong.

The size and material of the vertical and horizontal tubular members is not critical to this invention. Nevertheless, in the preferred embodiment the vertical tubular members are round steel tubing of one and one-quarter inches (3.17 cm) outside diameter and the horizontal tubular members are rectangular cross section steel tubing whose external cross sectional dimensions are approximately ¾ inch (1.9 cm) by 1½ inches (3.8 cm).

The upper and lower front horizontal members 20 and 22, the upper and lower rear horizontal members 24 and 26 and the end members 28, 30, 32 and 34, which are all of rectangular cross section, are each connected at their ends to the side surfaces of the circular cross section vertical tubular members 12, 14, 16 and 18 by means of a first novel connector arrangement according to the present invention. This first connector arrangement, which will be described in detail below, is simple in construction and assembly and provides an especially secure and solid interconnection.

The shelf support tubular members 36, 38, 40, 42, 44 and 46, which are also of rectangular cross section, are each connected at their ends to the side surfaces of the circular cross section tubular members 12, 14, 16 and 18 by means of a second novel connector arrangement according to the present invention. This second novel connector arrangement, which will also be described hereinafter, is also simple in construction and assembly, and permits ease in adjustment without requiring disassembly of the overall shelf structure.

Figure 2:
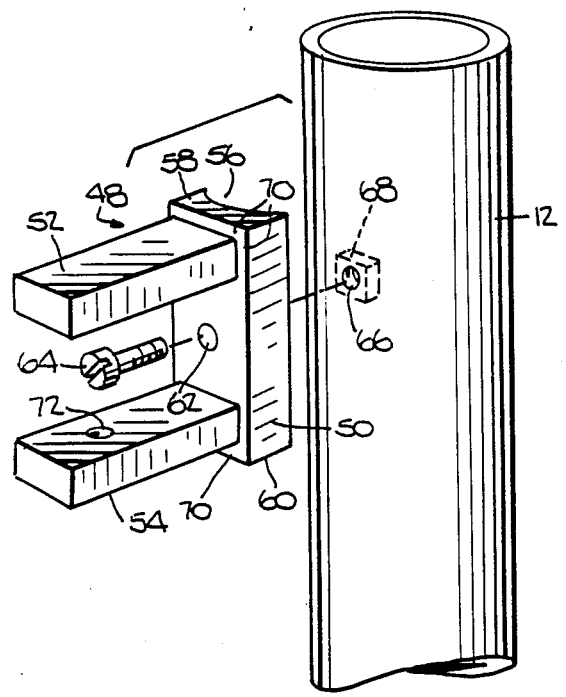
FIG. 2 is an exploded fragmentary perspective view showing a first novel connector element according to the present invention in association with a circular cross section tubular element.

FIGS. 2-7 show the details of the construction of the first novel connector arrangement. As can be seen in FIG. 2, this novel connector arrangement includes a connector element 48 which comprises a generally rectangular vertically extending base 50 with upper and lower arms 52 and 54 extending parallel to each other from one side of the base. The opposite side of the base 50 is formed with a concavity 56 which extends vertically from an upper surface 58 to a lower surface 60 of the base. A bolt hole 62 extends through the base 50 between the arms 52 and 54 and opens out generally centrally of the concavity 56.

Figure 3:
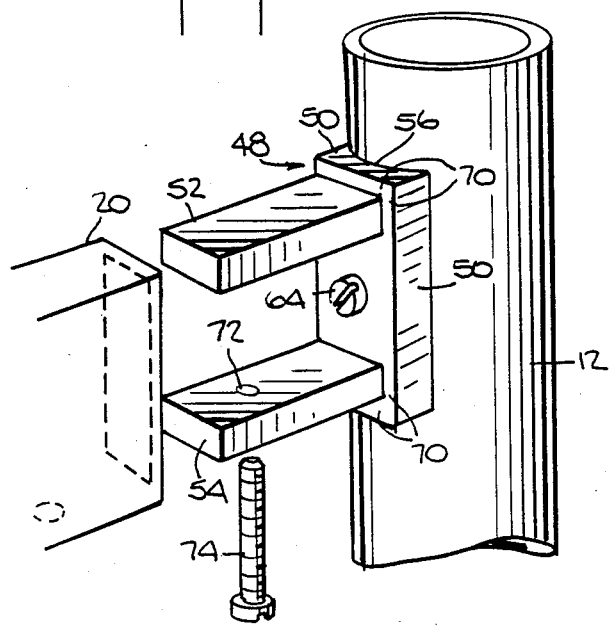
FIG. 3 is a perspective view similar to FIG. 2 and showing the novel connector element in association with a rectangular cross section tubular element.

As can be seen in FIG. 2, the connector element 48 is positioned with the concavity 56 against the curved outer surface of the tubular member 12 with the longitudinal axis of the concavity aligned with longitudinal axis of the curved outer surface of the tubular member 12. A bolt 64 is inserted through the bolt hole 62 and through a corresponding hole 66 in the tubular member 12. A nut 68 is positioned inside the tubular member 12 adjacent the hole 66 and the bolt 64 is tightened to the nut, thereby forcing the base 50 of the connector element 48 fast against the tubular member, as shown in FIG. 3.

The dimensions of and spacing between the arms 52 and 54 of the connector element 48 are such as to permit them to fit closely but loosely inside the open end of the rectangular cross section upper horizontal tubular member 20. As shown, the arms 52 and 54 are of rectangular cross section and are of substantially the same length. The arms 52 and 54 extend in cantilever fashion from the base; and in their normal unstressed condition they fit closely adjacent the opposite interior surfaces at the top and bottom portions of the rectangular cross section tubular member. As can be seen in FIGS. 2 and 3, the arms 52 and 54 are set back slightly from the upper, lower and side edges of the base 50 so as to leave ledges 70 against which the end of the horizontal tubular member can abut so that its outer surfaces will be flush with the outer surfaces of the base as seen in FIGS. 4-7.

Turning now to FIG. 4, it will be seen that the lower arm 54 of the connector element 48 is provided with a hole 72 through which a setscrew 74 is threaded to extend toward a location near the outer end of the underside of the upper arm 52. The horizontal tubular member 20 is also provided with an opening 76 at the bottom near its end to accommodate the setscrew 74 when the arms of the connector 48 are inserted into the end of the tubular member as shown in FIGS. 4 and 5.

To attach the horizontal tubular member 20 to the connector 48, the arms 52 and 54 of the connector are inserted into the open end of the tubular member so that its end comes to rest on the ledge 70 of the connector. This positions the opening 76 of the tubular member into alignment with the threaded hole 72 of the lower connector arm 54. The setscrew 74 is inserted through the opening 76 and threaded into and through the hole 72 as shown in FIG. 4. The setscrew is then turned until its end presses against the upper arm 54 of the connector 48. By tightening the setscrew 74, its end presses against the upper arm 54 and forces the ends of the arms 52 and 54 apart from each other. The arms 52 and 54 bend in cantilever fashion and press outwardly against opposite inner surfaces of the tubular member 20. This locks the tubular member 20 to the connector 48 in a very secure manner with a single setscrew.

As can be seen in FIG. 7, the concavity 56 of the connector member 48 has an arcuate cross section and extends along an elongated axis which is parallel to the longitudinal axis of the vertical tubular member 12. The radius of curvature of the concavity is somewhat smaller than that of the outer surface of the vertical tubular member so that a pair of pressure ridges 80 are formed on opposite sides of the connector 48 and extend longitudinally of the vertical tubular member 12 on opposite sides of the bolt 64. When the nut 68 is tightened on the bolt, these pressure ridges concentrate the force of the connector against the vertical tubular member to produce maximum gripping action.

It will also be noted that once the nut 68 is tightened to force the connector element 48 against the vertical tubular member, any tendency for the connector element to turn about the bolt axis will be opposed by the projection of the curved outer surface of the tubular member 12 into the concavity 56 of the connector member 48. Because of this, it is possible with the single central bolt 64 to securely fasten the connector member 48 to the tubular member 12 in proper alignment therewith.

It will also be noted from FIG. 7 that the nut 68, which is a square nut (as opposed to a six sided or hexagonal nut) has two of its opposite outer edges extending vertically and pressing against the inner curved surface of the vertical tubular member 12. This arrangement prevents the nut 68 from turning as the bolt 64 is tightened on it, thereby facilitating assembly of the connector element to the vertical tubular member. By use of a square nut, the length of the edges of the nut which press against the curved surface of the vertical tubular member 12 is maximized.

It will be appreciated from the foregoing that the above described novel connector assembly is simple in construction and permits rapid and convenient assembly of tubular members in proper orientation and in a very secure fashion using only one bolt and one setscrew. It will also be appreciated that because of the arrangement of the ledges 70 on the connector element 48, the squared off end of the rectangular cross section tubular member can be accommodated to the curved outer surface of the vertical tubular member without need for trimming or shaping of the end of the rectangular tubular member. Also, by forming the connector element with ledges 70, the outer surfaces of the connector element are made flush with the outer surfaces of the rectangular cross section tubular member so that a smooth overall appearance can be attained at the intersection between the tubular members.

Each of the horizontal members 20, 22, 24, 26, 28 30, 32 and 34 is secured at its ends to different ones of the vertical tubular 12, 14, 16 and 18 by means of the above described first connector arrangement. This forms the main structural portion of the shelf structure of FIG. 1.

The second connector assembly, which is illustrated in FIGS. 8-11, is used to secure the shelf support members 36, 38, 40, 42, 44 and 46 at their ends to the vertical tubular members 12, 14, 16 and 18. This second connector assembly permits rapid attachment and removal of the shelf support members without need for tools; and yet, when the shelf support members reassembled, they are not only held securely and in proper orientation, but as will be seen hereinafter, they actually contribute to the overall structural integrity of the shelf structure.

Figure 8:
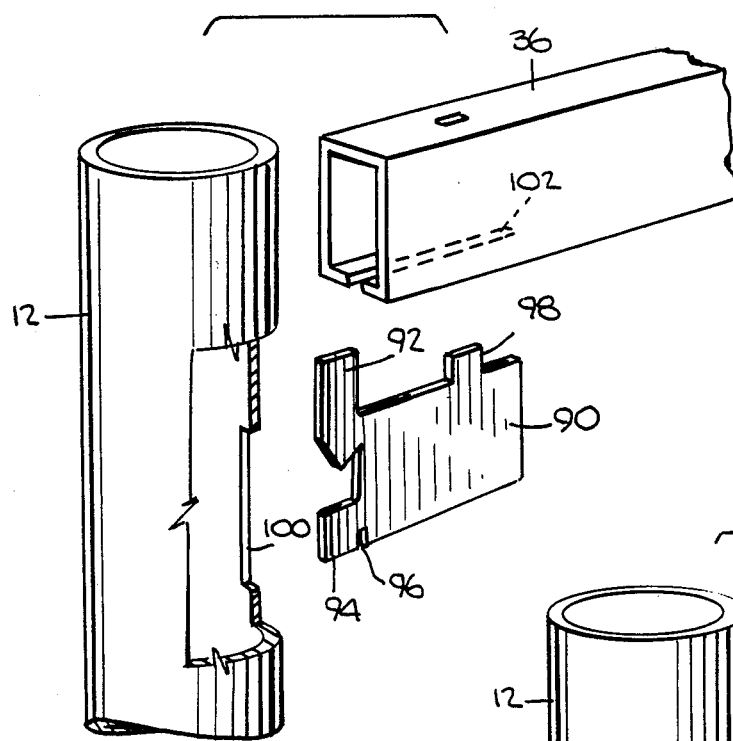
FIG. 8 is an exploded fragmentary perspective view showing a second novel connector element according to the present inVention in association with a circular and a rectangular cross section element.
Figure 10:
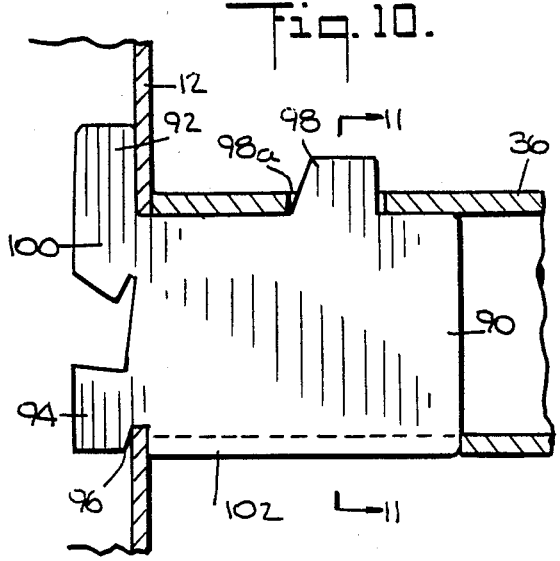
FIG. 10 is a side elevational view, taken in section, showing the connector element of FIGS. 8 and 9 fully assembled with the circular and rectangular cross section elements.

As best shown in FIGS. 8 and 10, the second connector assembly includes a generally rectangular connector plate 90, which is formed at one edge with an outwardly and upwardly projecting hook-like upper tab 92 and an outwardly projecting lower tab 94. A notch 96 is formed in the lower edge of the plate 90 at the lower tab 94. A top tab 98 extends upwardly from the upper edge of the connector plate 90 at a location displaced from the upper tab 92.

Figure 9:
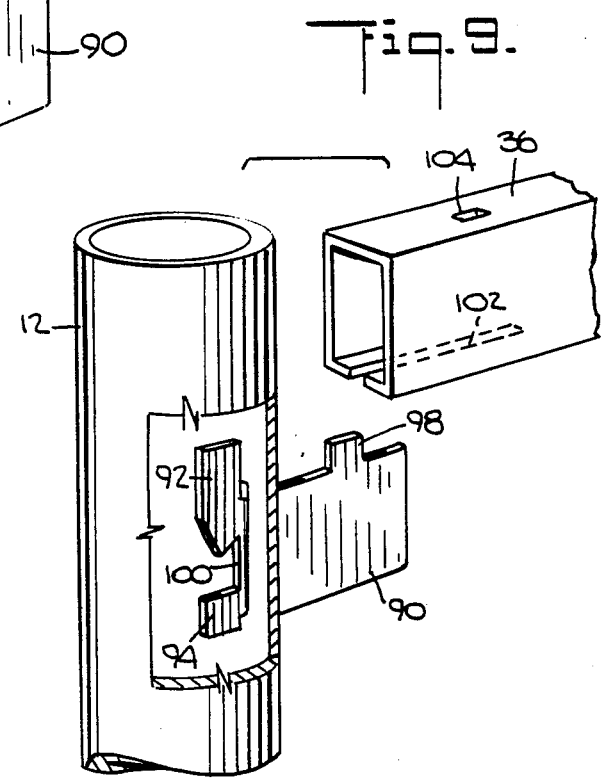
FIG. 9 is a perspective view similar to FIG. 8 showing the connector element assembled with the circular cross section element.

As shown in FIGS. 8-10, the vertical tubular member 12 is provided with a vertical slot 100 along its side. This slot is of a width and length to accommodate the end of the connector plate 90 with the upper and lower tabs 92 and 94 extending through the slot so that the upper tab rests against the inner surface of the vertical tubular member just above the slot and the notch 96 rests on the tubular member 12 at the bottom of the slot. The connector plate 90 thus extends as a bracket out from the tubular member 12 and is held by the action of its upper tab 92 against the inner surface of the tubular member 12 above the vertical slot 100 and by the bottom of the slot 100 extending into the connector plate notch 96. The connector plate 90 is easily assembled to the tubular member 12 by first inserting the hook-like upper tab 92 of the connector plate into the slot 100 and then turning the connector plate so that the tab 92 hooks inside the tubular member 12 above the slot. Then the connector plate 90 is lowered to bring the bottom of the slot 100 up into the notch 96.

Actually, as shown in FIG. 1, each of the vertical tubular members 12, 14, 16 and 18 are provided with series of vertical slots 100 extending along their length to accommodate connector plates 90 at various levels.

As shown in FIGS. 8 and 9, the bottom portion of the horizontal shelf support member 36 is provided with a longitudinal lower slot 102, which extends in from one end thereof to a distance at least as great as the length of the connector member 90. The slot 102 is wide enough to accommodate the thickness of the connector member. The top of the shelf support member 36 is also provided with a longitudinal upper slot 104 is displaced back from the end of the member 36. The upper slot 104 is dimensioned and located to accommodate the top tab 98 of the connector plate 90, as shown in FIG. 10, when the connector plate is assembled to the vertical tubular member 12 and the end of the shelf support member 36 is up against the tubular member.

The shelf support member 36 is assembled to the connector plate 90 as shown in FIG. 9. With the connector plate 90 extending out from the vertical tubular member 12, the end of the horizontal shelf support member 12 is brought over the connector plate 90 and lowered so that the connector plate passes up through the longitudinal lower slot 102. The shelf support member 36 is then lowered until the under side of its upper portion comes to rest on the upper edge of the connector plate 90. It should be noted that the vertical height of the connector plate 90 is such that when the shelf support member 36 rests on the upper edge of the connector plate the lower region of the connector plate extends into the longitudinal lower slot 102. At the same time the top tab 98 of the connector plate 90 projects through the upper slot 104 of the shelf support member 36.

Figure 11:
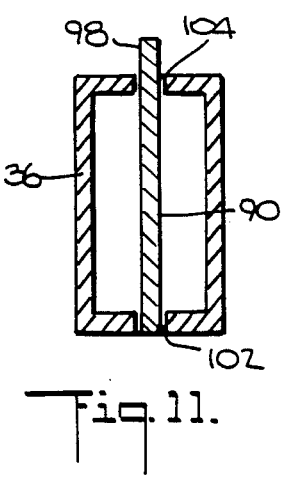
FIG. 11 is a cross section view taken along lines 11—11 of FIG. 10.

As can be seen in FIG. 11, the combination of the interaction of the lower region and the top tab of the connector plate 90 with the slots 102 and 104 of the shelf support member 36 serves to stabilize the shelf support member from twisting.

As can be seen in FIG. 10, the connector plate top tab 98 has a side edge 98a which slants downwardly toward the vertical tubular member 12. As a result, the top tab interacts with the upper slot 104 of the shelf support member 36 as it is pushed down on the connector plate 90; and forces the shelf support member 36 against the vertical tubular member 12, to provide increased locking action and to strengthen the entire assembly.

Each end of each shelf support member is connected to one of the vertical tubular members in the manner described above.

Although the second connector arrangement provides very solid support for the shelf support members and increased strength to the overall framework structure, the shelf support members are easily removed and can be reset at different positions along the vertical tubular members without need to disassemble the overall structure. It is only necessary to lift the shelf support members up off their respective connector plates 90, remove and reposition the connector plates and reinstall the shelf support members.

Shelving of any kind may be provided on the shelf support members. In order to hold shelving in place, it may be provided with slots (not shown) on the underside thereof to accommodate the portion of the connector plate top tubes which projects up through the shelf support member upper slots 104. Alternatively, Z-shaped brackets can be hung from the shelf support members and appropriate shelving can be hung on these brackets.

It will be appreciated from the foregoing that the connector arrangements described herein provide simplicity of construction, ease in assembly, high strength and structural rigidity with convenient adjustability.

I claim:

1. A connector assembly comprising a first elongated tubular member having a curved outer surface, a connector connecting together an end of a second elongated tubular member and said curved outer surface of said first elongated tubular member, said connector comprising a block having a first surface formed with a concavity which extends along a line and opens at its opposite ends to upper and lower surfaces of said block, said block being formed with a hole which extends therethrough to accommodate a bolt, said hole opening out near the center of said concavity, a bolt extending through said hole and into the curved outer surface of said first elongated tubular member and securing said block to said first elongated tubular member with said concavity facing, and in alignment with, the curved outer surface of said first elongated tubular member, and a portion of said block away from said concavity being attached to said end of said second elongated tubular member, the edges of said concavity being located near the side edges of the block to form therewith narrow ridges which press tightly against the curved outer surface of said first elongated tubular member.

2. A connector assembly according to claim 1, wherein said concavity is semi-cylindrical in shape and has a radius of curvature less than the radius of curvature of the curved outer surface of said first elongated tubular member.

3. A connector assembly according to claim 1, wherein said bolt extends from said hole at a location between said ridges and centrally between the upper and lower surfaces of said block.

4. A connector assembly according to claim 1, wherein a nut is positioned inside said first elongated tubular member and is threaded to said bolt.

5. A connector assembly according to claim 4, wherein said nut has edges which press against the curved inner surface of said first elongated tubular member along lines parallel to its longitudinal axis.

6. A connector assembly according to claim 5, wherein said nut is a square nut.

7. A connector assembly according to claim 1, wherein said portion of said block away from said concavity comprises a pair of spaced apart parallel arms extending from said block in a direction away from said first surface and into the open end of said second elongated tubular member, one of said arms having, near one end thereof, a threaded setscrew hole extending therethrough toward the other arm, a setscrew threaded toward the other arm, a setscrew threaded into the hole in said one arm and extending therefrom with the end of the setscrew pressing against the other arm and forcing the two arms apart to clamp against opposite inner surfaces of said second elongated tubular member.

8. A connector assembly according to claim 7, wherein said second elongated tubular member is formed with an opening in the bottom thereof for access to said setscrew.

9. A connector assembly for releasably connecting to a first elongated tubular member, an open end of a second elongated tubular member, said connector assembly comprising said second elongated tubular member and a generally rectangular connector plate, said connector plate being attachable along one vertical edge to said first elongated tubular member to project outwardly therefrom, said connector plate extending into the open end of said second elongated tubular member, said second tubular member being formed with an elongated slot extending along the bottom thereof and opening out to said one end, the upper edge of said connector plate supporting said second elongated tubular member along the under surface of the top portion thereof and said connector plate extending down and into said elongated slot.

10. A connector assembly according to claim 9, wherein said connector plate is formed with a top tab along a portion of its upper edge and wherein the top portion of said second elongated tubular member is formed with an upper slot into which said top tab extends.

11. A connector assembly according to claim 10, wherein the side edge of said top tab facing said first elongated tubular member slants downwardly toward said first elongated tubular member so that as said second elongated tubular member is lowered to insert said top tab into said upper slot, the top tab forces said second elongated tubular member toward said first elongated tubular member.

12. A connector assembly according to claim 9, wherein said connector plate has a hook-like upper tab projecting out from a side edge thereof adjacent the surface of said first elongated tubular member, said upper tab extending into a vertical slot in the side of said first elongated tubular member and engaging the inner surface of said first elongated tubular member above said vertical slot.

13. A connector assembly according to claim 12, wherein said connector plate has a lower tab projecting out from said side edge below said upper tab, said lower tab extending into a vertical slot in the side of said first elongated tubular member, said lower tab resting on the bottom of said vertical slot.

14. A connector assembly according to claim 13, wherein said connector plate is formed with a notch at the bottom thereof of said lower tab and wherein the lower edge of said vertical slot fits into said notch.

* * * * *

UNITED STATES PATENT AND TRADEMARK OFFICE
CERTIFICATE OF CORRECTION

PATENT NO. : 4,923,322
DATED : May 8, 1990
INVENTOR(S) : ROBERT J. BURG

It is certified that error appears in the above-identified patent and that said Letters Patent is hereby corrected as shown below:

ON TITLE PAGE:
AT [56] REFERENCES CITED

U.S. Patent Documents, "Anderson" should read --Andersson--.

COLUMN 1

Line 8, "De-" should be deleted.
    Line 9, "scription of the Prior Art" should read --2. Description of the Prior Art--.

COLUMN 2

Line 52, "inVention" should read --invention--.

COLUMN 4

Line 15, "tubular member," should read --tubular member 12,--.

COLUMN 5

Line 14, "six sided" should read --six-sided--.
    Line 25, "above described" should read --above-described--.
    Line 31, "squared off" should read --squared-off-.
    Line 41, "28 30," should read --28, 30,--.
    Line 43, "vertical tubular 12, 14, 16 and 18" should read --vertical tubular members 12, 14, 16 and 18--.
    Line 52, "reassembled," should read --are reassembled,--.

UNITED STATES PATENT AND TRADEMARK OFFICE
CERTIFICATE OF CORRECTION

PATENT NO. : 4,923,322

DATED : May 8, 1990

INVENTOR(S) : ROBERT J. BURG

It is certified that error appears in the above-identified patent and that said Letters Patent is hereby corrected as shown below:

COLUMN 6

Line 28, "is" should be deleted.
Line 40, "member 12" should read --member 36--.

Signed and Sealed this

Eighteenth Day of August, 1992

Attest:

DOUGLAS B. COMER

*Attesting Officer*   *Acting Commissioner of Patents and Trademarks*